United States Patent [19]

Ivancso, Jr. et al.

[11] Patent Number: 5,560,473
[45] Date of Patent: Oct. 1, 1996

[54] DRIVE MECHANISM FOR A CARTON CONVEYOR

[75] Inventors: Thomas L. Ivancso, Jr., Hoffman Estates; Robert S. Kilian, Franklin Park; Kraig L. Klopfenstein, South Barrington, all of Ill.

[73] Assignee: The Paxall Group, Inc., Skokie, Ill.

[21] Appl. No.: 336,677

[22] Filed: Nov. 7, 1994

[51] Int. Cl.$^6$ .................................................. B65G 17/34
[52] U.S. Cl. .................. 198/803.11; 198/803.13
[58] Field of Search ................. 198/731, 626.5, 198/803.11, 803.13, 803.1

[56] References Cited

U.S. PATENT DOCUMENTS

| 3,325,977 | 6/1967 | Kirsten | 198/803.11 X |
| 3,779,364 | 12/1973 | Kammann | 198/803.11 X |
| 3,857,474 | 12/1974 | Hutson | 198/803.11 X |
| 4,718,540 | 1/1988 | Greenwell | 198/803.11 X |
| 5,238,101 | 8/1993 | Ota et al. | 198/803.11 X |
| 5,328,021 | 7/1994 | Calvert et al. | 198/731 X |
| 5,407,059 | 4/1995 | Fochler | 198/803.11 X |

FOREIGN PATENT DOCUMENTS 2484968  12/1981  France .............................. 198/803.11

Primary Examiner—James R. Bidwell
Attorney, Agent, or Firm—David E. Dougherty

[57] ABSTRACT

A drive mechanism for a vertical cartoner which has a plurality of adjustable pockets including a primary drive motor, a servo motor and a clutch assembly for adjusting the pockets to accommodate cartons of different widths. The primary drive motor rotates a pair of sprockets which move a pair of endless chains along a predetermined pathway. When the clutch is engaged, the primary drive motor also rotates the servo motor through a pair of bevel gears. However, when the clutch is disengaged, the primary drive motor is stopped and the servo motor is energized to rotate one sprocket with respect to the other to thereby adjust the pockets to accommodate cartons of a different width.

6 Claims, 5 Drawing Sheets

DRIVE MECHANISM FOR A CARTON CONVEYOR

FIELD OF THE INVENTION

This invention relates to a drive mechanism for a carton conveyor and more particularly, to a drive mechanism for a carton conveyor which has a plurality of adjustable pockets and wherein the drive mechanism may be activated to adjust the size of the pockets to accommodate cartons of different widths.

BACKGROUND FOR THE INVENTION

Cartoning apparatus normally contain a magazine for receiving a supply of flat folded carton blanks and apparatus for ejecting those carton blanks from the magazine and erecting them into a generally rectangular tubular form. The cartoner typically includes a pair of endless chains, one carrying leading transport lugs and the other carrying trailing transport lugs. In such apparatus, a carton is erected and captured between the leading and trailing transport lugs. The carton is then held between these lugs as it passes through a filling station.

As the carton passes through the filling station, a barrel loader thrusts product into the carton, and as it passes through a gluing and flap closing apparatus, the carton is sealed. However, if a carton as it is transported through the sealing stages is not square, the flaps are misaligned on the resulting package making it an unsightly or unacceptable package.

In typical applications, cartoner require frequent changeovers for running different sizes of cartons. In the changeover, mechanics use wrenches to loosen parts, slip the parts relative to one another and retighten the parts to fix them in that position. For example, the chain carrying the leading lug is physically shifted with respect to the chain carrying the trailing lugs to accommodate cartons of greater or lesser length. In this case, length refers to the dimension in the direction of machine movement, i.e., the carton width taken across the "face" or front panel of a carton.

One approach for automatically changing a carton over from one size to another is disclosed in U.S. Pat. No. 4,718,540 of Greenwell, which is incorporated herein in its entirety by reference. That patent discloses a horizontal cartoner having a main drive, an element, such as transport lugs and product bucket elements that are adjustable to accommodate different sizes of cartons. The patent also discloses automatic means for varying the position of those elements automatically using the power of the main drive to accomplish the adjustment while the machine is running. For example, if the machine is set to run a particular product and carton size, it is possible that the delivered carton may be dimensionally different from a previous run and do not handle as well. However, adjusting the transport lugs with respect to each other while the machine is running enables an operator to make adjustments while observing the operation on the machine. In essence, the phase adjusting system effects the linear adjustment of a center chain with respect to outside chains, thereby adjusting the spacing between the leading and trailing transport lugs to accommodate different sizes of cartons.

The concept of a mechanism for squaring a carton is addressed in a U.S. patent application of Kraig L. Klopfenstein entitled "Adjustable Pocket Mechanism", filed on NOV. 7, 1994, Ser. No. 08/336,672, assigned to the same assignee as the present application and included herein in its entirety by reference. As disclosed therein, the adjustable pockets comprise a pair of endless chains and a plurality of leading and trailing transport lugs. Means are provided for maintaining the leading and trailing transport lugs in each pair parallel as a carton is transported along a linear or non-linear pathway.

It has now been recognized that there may be a significant demand for an improved cartoner which maintains parallelism when the apparatus is moving along a non-linear path. It is also desirable that the apparatus maintains the squareness of a container as it moves through the filling station and which allows the filling station to be located in various positions along a non-linear path. It is also believed that there may be a significant demand for a cartoner which includes an improved drive mechanism which facilitates the set-up and/or change-over of a cartoner to accommodate cartons of different sizes.

It is presently believed that an improved cartoner according to the present invention will provide the aforementioned desirable features. It is also believed that an improved cartoner in accordance with the present invention provides means permitting individual or simultaneous adjustment of a fixture or locational device and means for the parallel adjustment of two or more surfaces. In addition, the approach according to the present invention provides for a manual or power driven adjustment and an opportunity for position monitoring during the operation of the cartoner.

In addition, an improved cartoner in accordance with the present invention maintains parallelism when the cartoner is dynamically loaded and isolates the driving mechanism from external bending moments. The cartoner facilitates set-up and change-over procedures and maintains parallelism throughout the entire process even in those cases where a drive chain has become stretched or worn. The apparatus also allows variation in cord length versus are length of the chain to be controlled. In addition, such cartoners can be economically manufactured and marketed in a competitive market, readily installed and maintained and are relatively durable.

BRIEF SUMMARY OF THE INVENTION

In essence, the present invention contemplates an improved drive mechanism for a carton conveyor which has a plurality of adjustable pockets for accommodating cartons of different widths.

The drive mechanism includes means such as a pair of parallel endless chains for transporting cartons along a pathway which may, for example, lie in a horizontal plane. The mechanism also includes a first pair of axially aligned parallel sprockets which are rotatable about a common axis. A second pair of axially aligned parallel sprockets lie in the same plane as the first pair of sprockets and are rotatable about a common axis which is parallel to the common axis to the first pair. The pair of endless chains engage and are driven by the sprockets.

A first drive means, such as an electric motor, drive shaft and appropriate gears rotate a first of the sprockets in one of the pair of sprockets to thereby move one of the chains along the pathway. The drive mechanism also includes clutches for connecting a second of the sprockets in a pair with the first or driven sprocket for rotation by the first sprocket when the clutch means is in a first condition as, for example, engaged. The clutch means also allow the second sprocket to rotate with respect to the first sprocket when the clutch is in a second condition such as being disengaged.

A servo motor is operatively connected to the second of the sprockets for rotating the second sprocket with respect to the first sprocket when the clutch is in its second position. Thus, when the first sprocket is stopped or stationary, the servo motor is used to rotate the second sprocket to lengthen or shorten the adjustable pocket to accommodate a carton of a different size. And then, when the pockets have been adjusted, the servo motor is deenergized and the clutch means engaged so that both of the chains are driven at the same speed by one pair of sprockets.

A preferred embodiment of the invention contemplates a carton conveyor which combines a plurality of adjustable pockets and an improved drive mechanism. The conveyor includes transport means for transporting the clutch along a generally horizontal non-linear pathway. This transport means includes two pair of axially aligned parallel sprockets with one of the sprockets in each of the pair disposed above the other and with each of the pairs rotatable about a common axis. The common axis of each of the pairs are parallel and the first or upper sprocket in each pair lie in a common horizontal plane. The second or lower sprocket in each pair also lie in a common plane which is relatively close to the upper plane.

An adjustable pocket mechanism includes a pair of endless chains with a first of the chains engaging the upper sprocket of each pair and with the second endless chain engaging the lower sprocket. The mechanism also includes a leading transport lug which is fixed to a first of the chains and freely movable forwardly and rearwardly in the direction of movement with respect to the second chain. A trailing transport lug is fixed to the second of the chains but free to move forwardly or rearwardly with respect to the first chain.

A first drive means such as a motor, shaft and gear box rotate one of the sprockets.

An adjusting means for adjusting the relative position of the sprockets within a pair of sprockets is also provided. Adjusting the relative position of the sprockets also adjusts the relative position of the leading and trailing transport lugs to change the length of the pockets so that they will accommodate cartons of different widths. The adjusting means includes a clutch for connecting the sprockets in a pair so that both sprockets are rotated by the drive means when the clutch is engaged. The clutch also disconnects the drive from the second sprocket and allows the sprockets to rotate with respect to one another when the clutch is disengaged.

A servo motor is connected to the second sprocket and rotates the second sprocket with respect to a first of the sprockets when the clutch is disengaged and the servo motor energized. In the preferred embodiment of the invention, the servo motor or its shaft is connected to the second sprocket by a pair of bevel gears and like the second sprocket is rotated by the first sprocket when the clutch is engaged. For this reason, the first drive means is deenergized or stopped before energizing the servo motor.

In the preferred embodiment of the invention, means are also provided for maintaining the leading and trailing lugs parallel as the pocket is transported along a linear and/or non-linear pathway.

The invention will now be described in connection with the accompanying drawings wherein like reference numerals have been used to designate like parts.

DESCRIPTION OF THE PREFERRED EMBODIMENTS OF THE INVENTION

Figure 1:
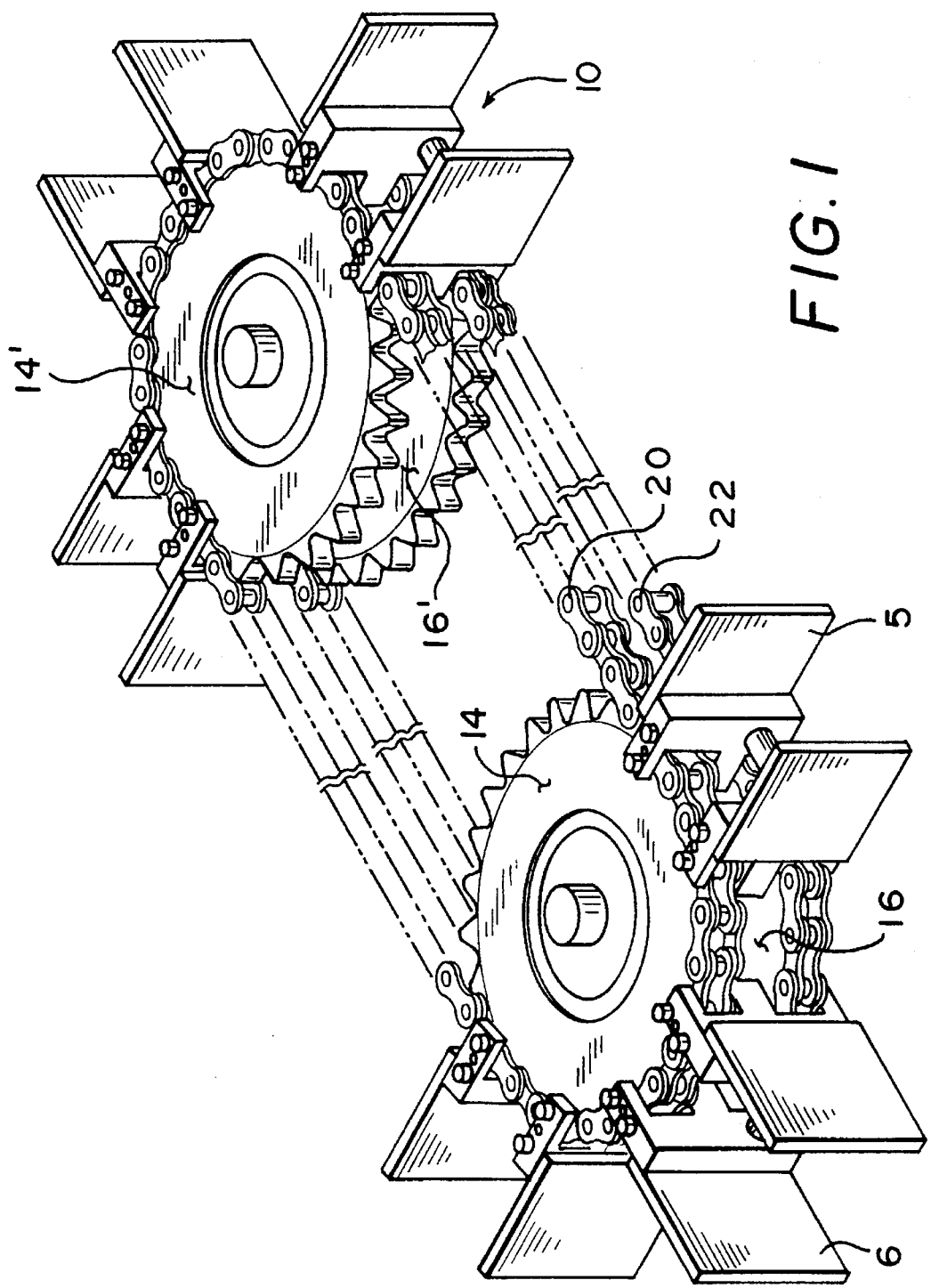
FIG. 1 is a perspective view illustrating an adjustable pocket mechanism and a portion of the drive mechanism in accordance with a preferred embodiment of the invention.
Figure 2:
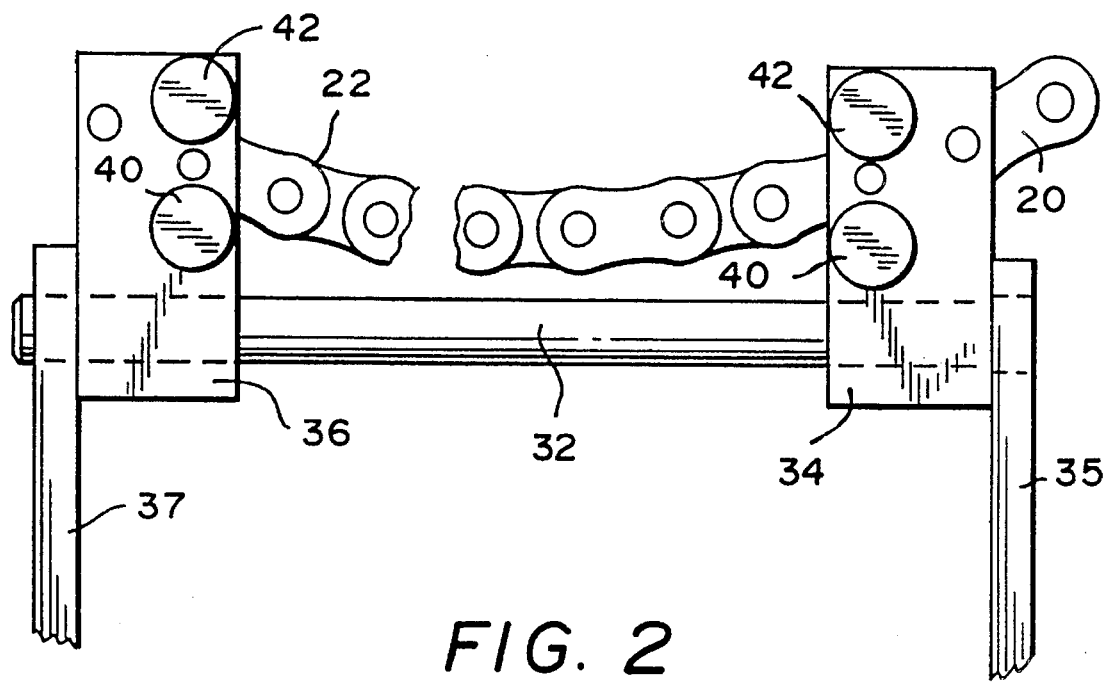
FIG. 2 is a top or plan view of an adjustable pocket mechanism of a type which is incorporated in the present invention.

FIG. 1 shows a sprocket drive for a carton conveyor which includes upper and lower sprockets 14 and 16, each of which drives an endless chain 20 and 22. The upper chain 20 carries a plurality of transport lugs 5 at spaced intervals therealong while the lower chain 22 carries a plurality of trailing transport lugs 6. The transport lugs 5 and 6 form an adjustable pocket mechanism which engages the opposite sides of a box (not shown in FIG. 1) and propels it along a horizontal flat bed of a machine. The lugs 5 and 6 extend outwardly and are parallel to each other and are described in detail in the aforementioned copending application of Kraig L. Klopfenstein.

As shown in FIGS. 1–4, the adjustable pocket mechanism 10 is constructed and arranged to transport a carton 12 (see FIG. 4) along a non-linear pathway as it is carried through its filling and sealing operations in a vertical cartoner. However, it should be recognized that the invention may also be applicable to a horizontal cartoner. As shown more clearly in FIG. 4, a plurality of cartons 12 are shown as they travel along a linear path and around a semi-circular path defined by a pair of parallel sprockets 14 and 16 as the carton passes through and beyond the filling operation. A second pair of sprockets 14' and 16' (see FIG. 1) lie in the same planes as sprockets 14 and 16 to complete a generally rectangular pathway with semi-circular ends. As the cartons 12 are transported to a curved portion of the pathway, they are brought into register with a plurality of fillers 15. The plurality of fillers or spouts 15 are mounted on sprocket 14 and rotated thereby so that they are brought into register with the cartons 12 as the cartons follow a semi-circular pathway around sprocket 16. It is important that the cartons are maintained square so that they are in register with a spout portion of fillers 15. If not, a portion of the charge would be dumped on the outside of the carton which would result in partial filling of the carton and a portion of the charge falling on the floor and/or into the machinery.

The adjustable pocket mechanism 10 includes a pair of parallel endless chains 20, 22 which are disposed one above the other around sprockets 14, 14' and 16, 16'. The mechanism also includes a pair of lugs 34 and 36. A first of the lugs 34 referred to as a leading transport lug is fixed to a first or top of endless chain 20 and at the same time slidably engages a lower of the endless chains 22. In other words, the leading lug 24 is free to move forwardly or rearwardly with respect to the lower chain 22. A second of the lugs 26 or trailing lug is then fixed to the second or lower chain 22 and slidably engages the first or upper chain 20 so that it is freely movable forwardly and rearwardly with respect to the first of the chains 20.

Figure 4:
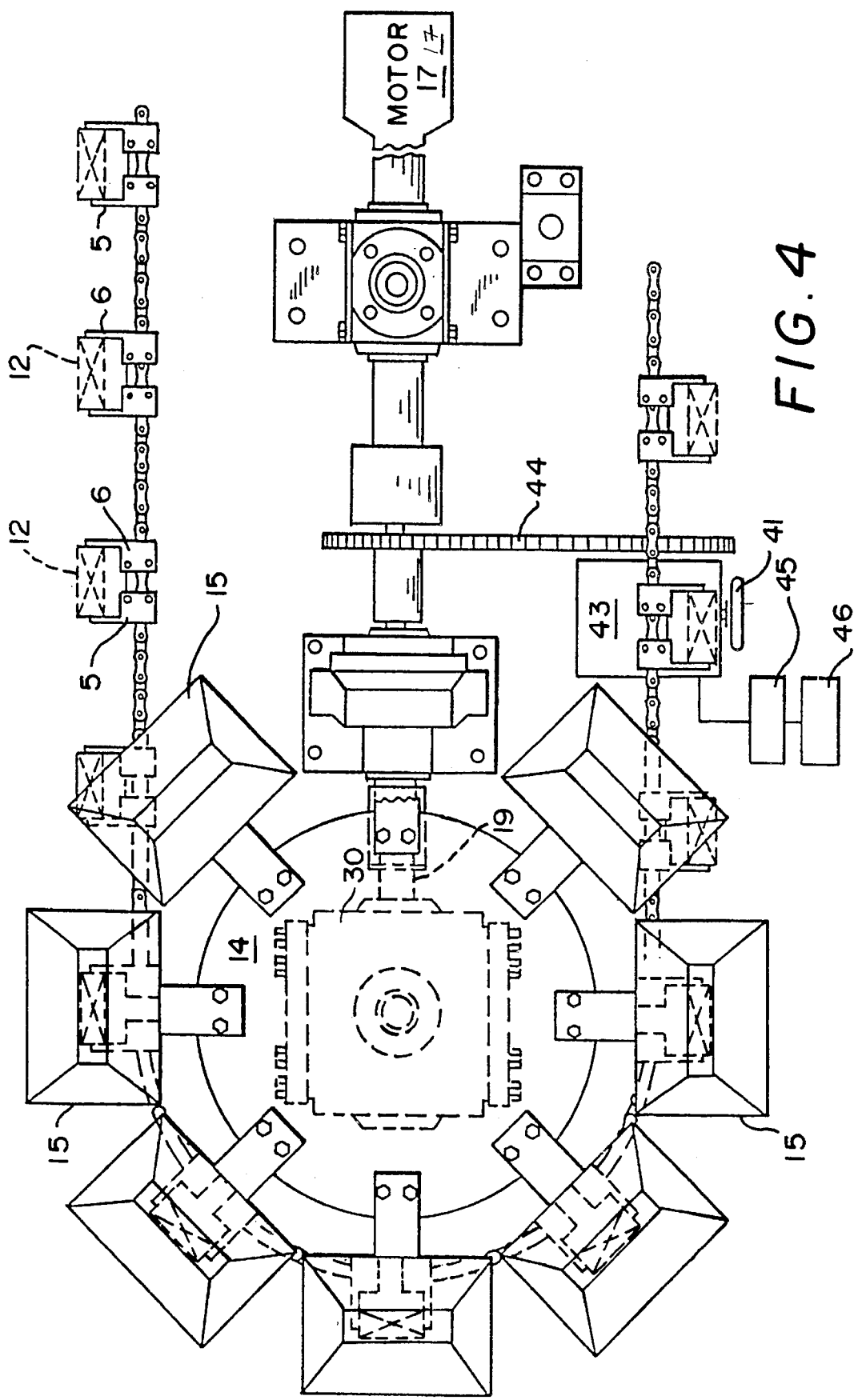
FIG. 4 is a top or plan view of a portion of a vertical cartoner which includes an adjustable pocket and a drive mechanism in accordance with the present invention.

Means such as a clutch mechanism 30 are provided for adjusting the chains relative to one another and for fixing the relative position of the sprockets and/or chains as illustrated in FIG. 4. As illustrated, the simple clutch mechanism 30 may be used to lock the upper sprocket 16 and lower sprocket 14 together. In this way, a simple drive mechanism such as the shaft 19 driven by a motor 17 rotates the upper sprocket 16. Since the upper sprocket 16 is in locked engagement with the lower sprocket 14, the two endless chains 20 and 22 are moved about the sprockets at the same speed and in the same relative position. Then, when it is desired to adjust the length of the pocket, the clutch is disengaged so that the upper sprocket moves forward or rearwardly with respect to the lower sprocket to thereby change the length of the pocket. The means for adjusting the relative position of the sprockets and chains may take the form shown in U.S. Pat. No. 4,718,540, entitled "Automatic Change Over for a Cartoner", which is incorporated herein in its entirety by reference. However, as presently envisioned, a more simplified arrangement may be used.

It is also contemplated that the relative position of the upper and lower chains 20 and 22 can be adjusted manually by means of a knob 41. The knob 41 moves a driving element 43 and drive member 44 to position the sprocket 16 with respect to sprocket 14 in a conventional manner. It is also contemplated that such adjustments can be accomplished by means of a computer 45 and input 46.

One feature of the present invention is a mechanism for maintaining the squareness of the carton as it passes around a semi-circular pathway. That mechanism incorporates a guide rod 32 which may be of any convenient cross-section such as circular or square. The guide rod 32 extends through leading and trailing elements 34 and 36 to fix the elements 34 and 36 in a parallel relationship with one another. A pair of fingers 35 and 37 or carton gripping members are fixed to and extend outwardly from elements 34 and 36. Rod 32, which is cylindrical in a preferred embodiment of the invention, is fixed within a sleeve within element 34, as for example, by being press-fit therein. Other means for fixing the guide rod 32 to element 34 may be used. The guide rod 32 passes through a second sleeve in the second or trailing lug 36. The guide rod 32 slidably engages the second sleeve so that the distance between element 34 and element 36 can be varied by sliding the elements 34 and 36 closer together are further apart. In either case, this parallel relationship is maintained by the guide rod 32 in cooperation (close fit) with the sleeve in lug or element 36.

Figure 3:
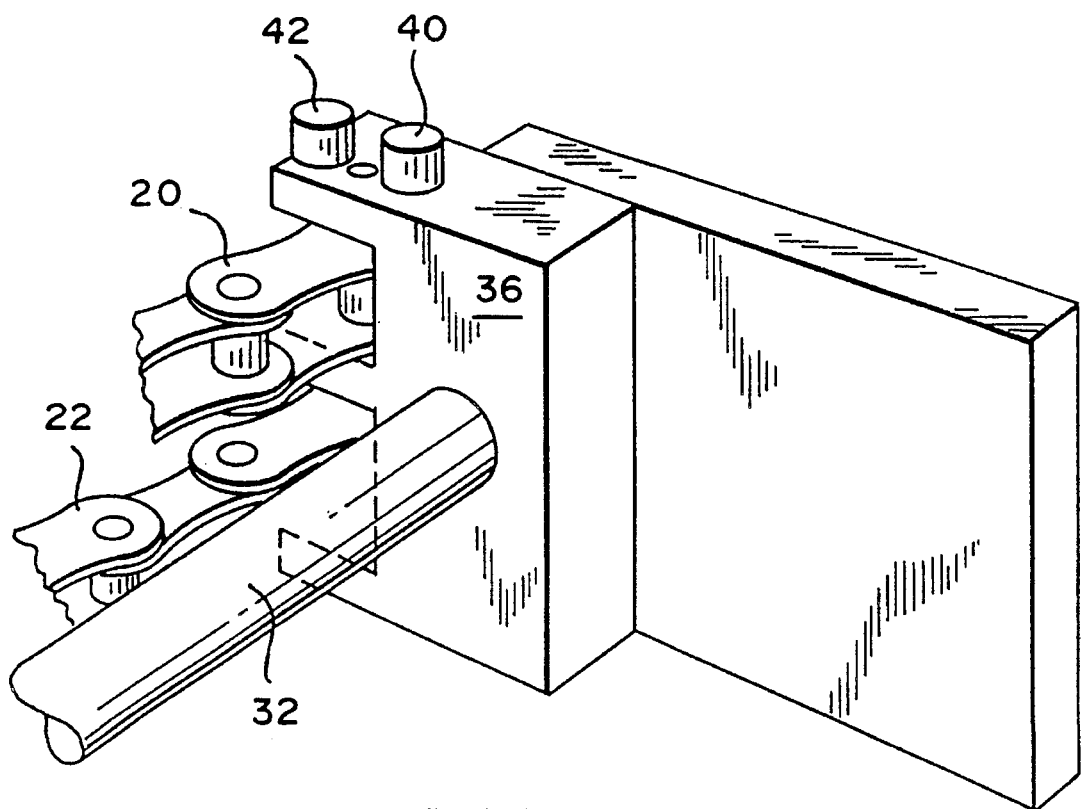
FIG. 3 is a perspective view which illustrates a portion of the adjustable pocket mechanism which is shown in FIG. 2.

A pair of rollers 40 and 42 as shown more clearly in FIG. 3 are disposed on each of the elements 34 and 36 for engaging a rail (not shown) to thereby guide the elements 34 and 36 along a selected pathway (see FIG. 4).

The distance between elements 34 and 36 are adjusted to accommodate a carton 12 of a different width than a provided carton and to position it with respect to sprocket 16 so that the open "squared" cartons 12 are brought into alignment with or into register with the spouts 15 so that a charge of material may be emptied into each of the cartons 12. As shown in FIG. 4, the distance or spacing between the transport lugs 5 and 6 will be matched with the size of a carton at the time of a change over.

It should also be recognized that the radius of sprockets 14 and 16 should be sufficient to accommodate the change in the length of the pocket. For example, in a presently preferred embodiment of the invention, each of the sprockets has a diameter of about 24 inches while the longitudinal adjustment of the pocket is limited to about 7 inches. It is presently believed that the diameter of the sprocket should be about 3 times the length of the pocket adjustment so that the parallelism of the pocket as it passes around the sprocket does not cause the chain to become disengaged.

Figure 5:
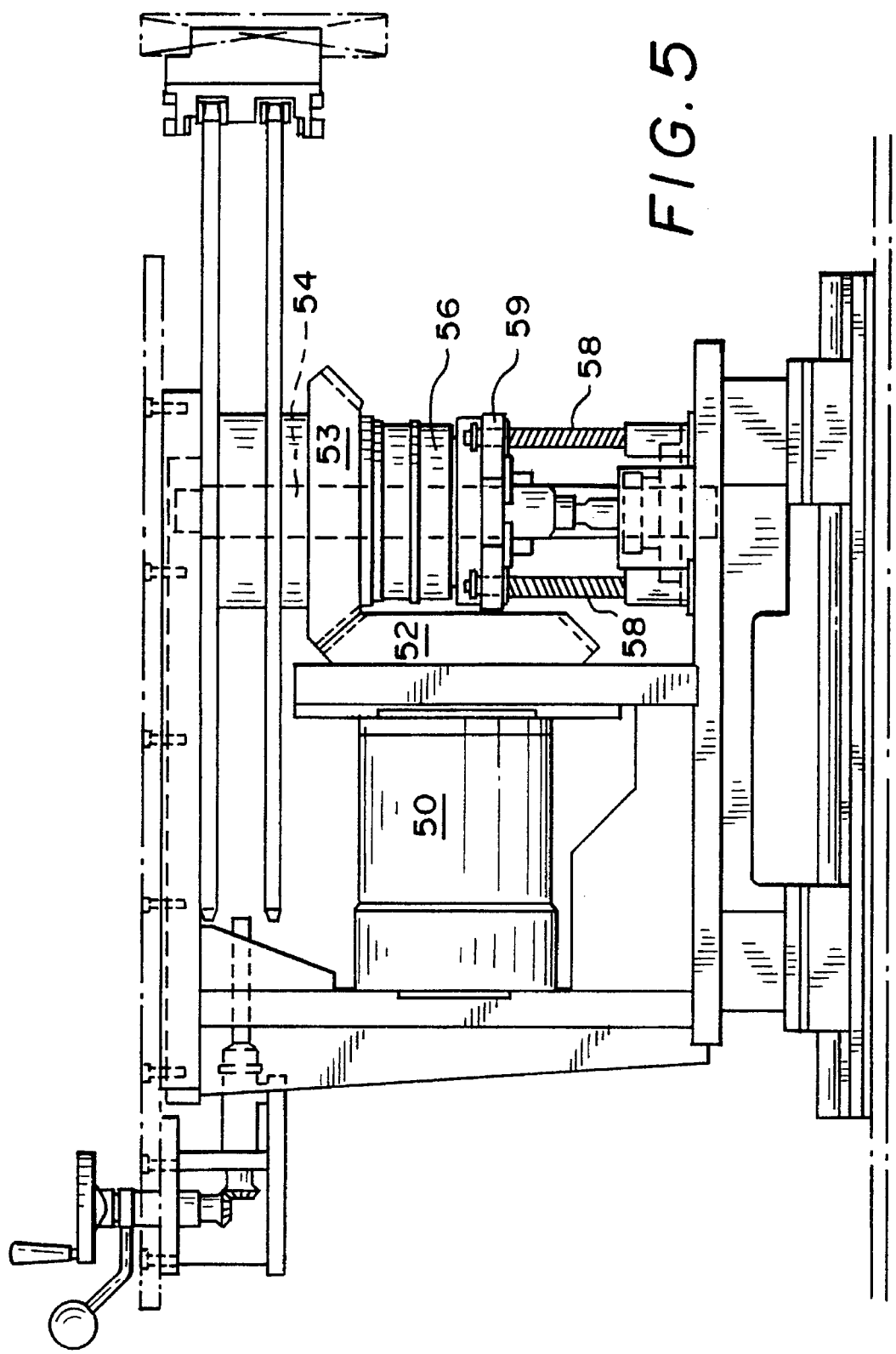
FIG. 5 is a side elevational view of a second portion of a drive mechanism in accordance with the preferred embodiment of the invention.
Figure 6:
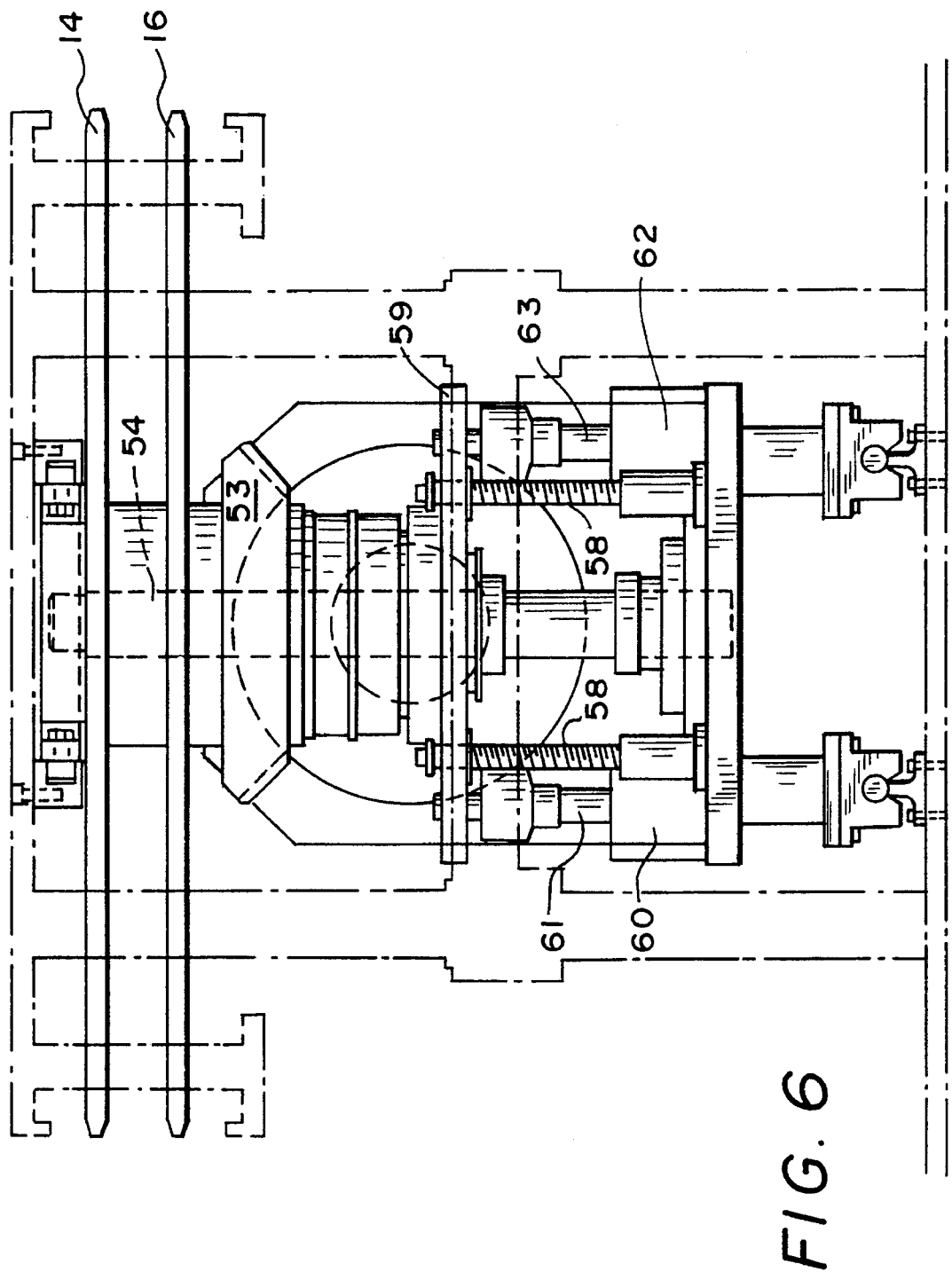
FIG. 6 is an end view of the mechanism shown in FIG. 5.

A key feature of the present invention is illustrated in FIGS. 5 and 6. As shown therein, a drive mechanism such as a servo motor 50 is connected to a pair of bevel gears 52 and 53 in a conventional manner. The servo motor 50, which is preferably a DYNASERVE servo motor, rotates a pair of bevel gears 52 and 53. The servo motor 50 is connected through the bevel gears 52 and 53 to the sprockets 14 and 16 by means of a shaft 54 (shown in dotted lines) and clutch 56. Thus, when the clutch is engaged, the sprockets 14 and 16 are fixed or clamped together so that they rotate as a single unit. And, as the sprockets 14 and 16 rotates, the bevel gears 52 and 53 and servo motor 50 are all rotated by means of a motor (not shown in FIG. 5) in conjunction with the drive shaft 54. The drive shaft 54 drives the upper sprocket 14 or 14' in a customary manner.

In the operation of the device, the primary drive is stopped, the clutch 56 is disengaged so that the sprocket 16 is free to rotate with respect to sprocket 14 to thereby move the upper chain 20 forwardly or rearwardly with respect to the lower chain 22. For example, a pair of air cylinders 60 and 62 (see FIG. 6) may be used to engage and disengage clutch 56 by means of a pair of piston drive shafts 61 and 63, guide rods 58 and plate 59. Other types of clutch assemblies can be readily substituted for the air cylinder activated assembly as will be well understood by those of ordinary skill in the art.

When the drive 54 is stopped and clutch 56 disengaged, the servo motor 50 is energized which rotates the bevel gears 52 and 53 and sprocket 16 while the upper sprocket 14 remains stationary. When the lower sprocket has been rotated to separate the leading and trailing lugs 5 and 6 by the desired amount to accommodate a preselected carton, the servo motor 50 is shut off. When the servo motor has been shut off, the air cylinders are de, energized so that the mechanical clutch assembly is engaged which locks the sprockets 14 and 16 together in a fixed relationship. The sprockets 15 and 16 are then rotated by means of the drive motor 17 (FIG. 4).

While the invention has been described in connection with its preferred embodiment, it should be recognized that changes and modifications may be made therein without departing from the scope of the appended claims.

What is claimed is:

1. A carton conveyor of the type having a plurality of adjustable pockets to accommodate cartons of different sizes and a drive mechanism therefor comprising:

transport means for transporting the cartons along a generally horizontal pathway including two pair of axially aligned parallel sprockets with one of said sprockets in each of said pairs disposed above the other and rotatable about a common axis and wherein the common axis for each of said pair of sprockets is parallel with the common axis of the other pair and wherein the upper sprockets of each of said pair lie in a common plane and the lower sprockets of said pairs lie in a common plane;

an adjustable pocket mechanism including a pair of endless chains with a first of said chains engaging said upper sprockets and with a second of said pair of chains engaging said lower sprockets, a leading transport lug fixed to a first of said chains and freely movable forwardly and rearwardly in the direction of movement with respect to said second of said chains, a trailing transport lug fixed to said second of said chains and freely movable forwardly and rearwardly in the direction of movement with respect to said first of said chains;

means including a guide rod fixed at one end to one of said leading and trailing transport lugs, a sleeve in the other of said leading and trailing transport lugs and said guide rod extending through said sleeve in sliding engagement for maintaining the leading and trailing lugs parallel as the pocket is transported along a non-linear pathway:

a first drive means for rotating one of said sprockets; and adjusting means for adjusting the chains relative to one another and for fixing the relative position of said chains with respect to one another so that the length of the pocket formed by said leading and trailing lugs can be adjusted to accommodate different sizes of cartons, said adjusting means including a clutch for connecting a second of said sprockets to a first of said sprockets in a pair for rotation therewith by said drive means when said clutch is engaged and for allowing said second of said sprockets to rotate with respect to said first of said sprockets when said clutch is disengaged; and a servo motor operatively connected to said second of said sprockets for rotating the second of said sprockets with respect to said first of said sprockets when said clutch means is disengaged so that the adjustable pockets are adjusted by the change in the relative positions of said pair of sprockets to accommodate cartons of different sizes.

2. A carton conveyor according to claim 1 wherein both of said transport lugs include a sleeve and in which said guide rod is fixed within one of said sleeves.

3. A drive mechanism according to claim 1 which includes a bevel gear assembly for transmitting rotation from said servo motor to said second of said sprockets.

4. A drive mechanism according to claim 3 which includes means for energizing and deenergizing said servo motor so that said servo motor is deenergized and freely rotatable during the rotation of said first of said sprockets.

5. A drive mechanism according to claim 4 which includes an air cylinder and means for energizing said air cylinder to engage said clutch means to thereby lock said second of said sprockets and said bevel gear assembly to said first of said sprockets for rotation therewith.

6. A carton conveyor according to claim 2 wherein said guide rod and said sleeves each have a generally circular cross section and with a close fit therebetween.

* * * * *